United States Patent
Perea et al.

(10) Patent No.: US 9,847,175 B2
(45) Date of Patent: Dec. 19, 2017

(54) METHOD FOR STACKING ELECTRONIC COMPONENTS

(71) Applicant: Kemet Electronics Corporation, Simpsonville, SC (US)

(72) Inventors: Maurice Perea, Simpsonville, SC (US); R Allen Hill, Simpsonville, SC (US); Reggie Phillips, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 309 days.

(21) Appl. No.: 14/152,389

(22) Filed: Jan. 10, 2014

(65) Prior Publication Data

US 2014/0123453 A1    May 8, 2014

Related U.S. Application Data

(62) Division of application No. 13/533,576, filed on Jun. 26, 2012, now Pat. No. 8,873,219.

(51) Int. Cl.
| | | |
|---|---|---|
| *H01G 7/00* | (2006.01) | |
| *H01G 4/30* | (2006.01) | |
| *H01C 1/14* | (2006.01) | |
| *H01G 4/232* | (2006.01) | |
| *H01C 1/014* | (2006.01) | |

(52) U.S. Cl.
CPC ............. *H01G 4/30* (2013.01); *H01C 1/14* (2013.01); *H01G 4/232* (2013.01); *H01C 1/014* (2013.01); *Y10T 29/417* (2015.01); *Y10T 29/43* (2015.01)

(58) Field of Classification Search
CPC . H01C 1/14; H01C 1/014; H01C 1/02; H01C 1/022; H01C 1/034; H01C 1/016; H01G 4/232; H01G 4/30; H01G 4/236; H01G 4/258; Y10T 29/417; Y10T 29/43
USPC .............. 29/25.41, 25.42, 827, 825, 592.1; 361/813
See application file for complete search history.

(56) References Cited

U.S. PATENT DOCUMENTS

| | | | | |
|---|---|---|---|---|
| 4,635,026 | A * | 1/1987 | Takeuchi ............... | H01C 1/02 219/541 |
| 4,747,013 | A * | 5/1988 | Dexel .................... | H01G 2/14 29/25.42 |
| 5,548,473 | A * | 8/1996 | Wang .................... | H01G 4/224 361/301.1 |
| 6,181,544 | B1 * | 1/2001 | Nakagawa ............ | H01G 4/228 361/306.1 |

(Continued)

*Primary Examiner* — A. Dexter Tugbang
*Assistant Examiner* — Azm Parvez
(74) *Attorney, Agent, or Firm* — Joseph T. Guy; Perkins Law Firm, LLC

(57) ABSTRACT

A method of forming a stacked electronic component, and an electronic component formed by the method wherein the method includes:
providing a multiplicity of electronic components wherein each electronic component comprises a first external termination and a second external termination;
providing a first lead frame plate and a second lead frame plate wherein the first lead frame plate and the second lead frame plate comprises barbs and leads;
providing a molded case comprising a cavity and a bottom; and forming a sandwich of electronic components in an array between the first lead frame plate and the second lead frame plate with the barbs protruding towards the electronic components and the leads extending through the bottom.

30 Claims, 4 Drawing Sheets

(56) References Cited

U.S. PATENT DOCUMENTS

| | | | | |
|---|---|---|---|---|
| 6,400,551 B1* | 6/2002 | Lin | ............... | H01G 2/06 |
| | | | | 361/301.3 |
| 8,331,078 B2* | 12/2012 | McConnell | ............ | H01G 4/232 |
| | | | | 361/303 |
| 8,988,857 B2* | 3/2015 | McConnell | ............. | H01G 4/30 |
| | | | | 361/306.3 |
| 2009/0108435 A1* | 4/2009 | Bernstein | ............. | H01L 23/473 |
| | | | | 257/691 |
| 2009/0147440 A1* | 6/2009 | Cygan | ................. | H01G 4/232 |
| | | | | 361/306.3 |

* cited by examiner

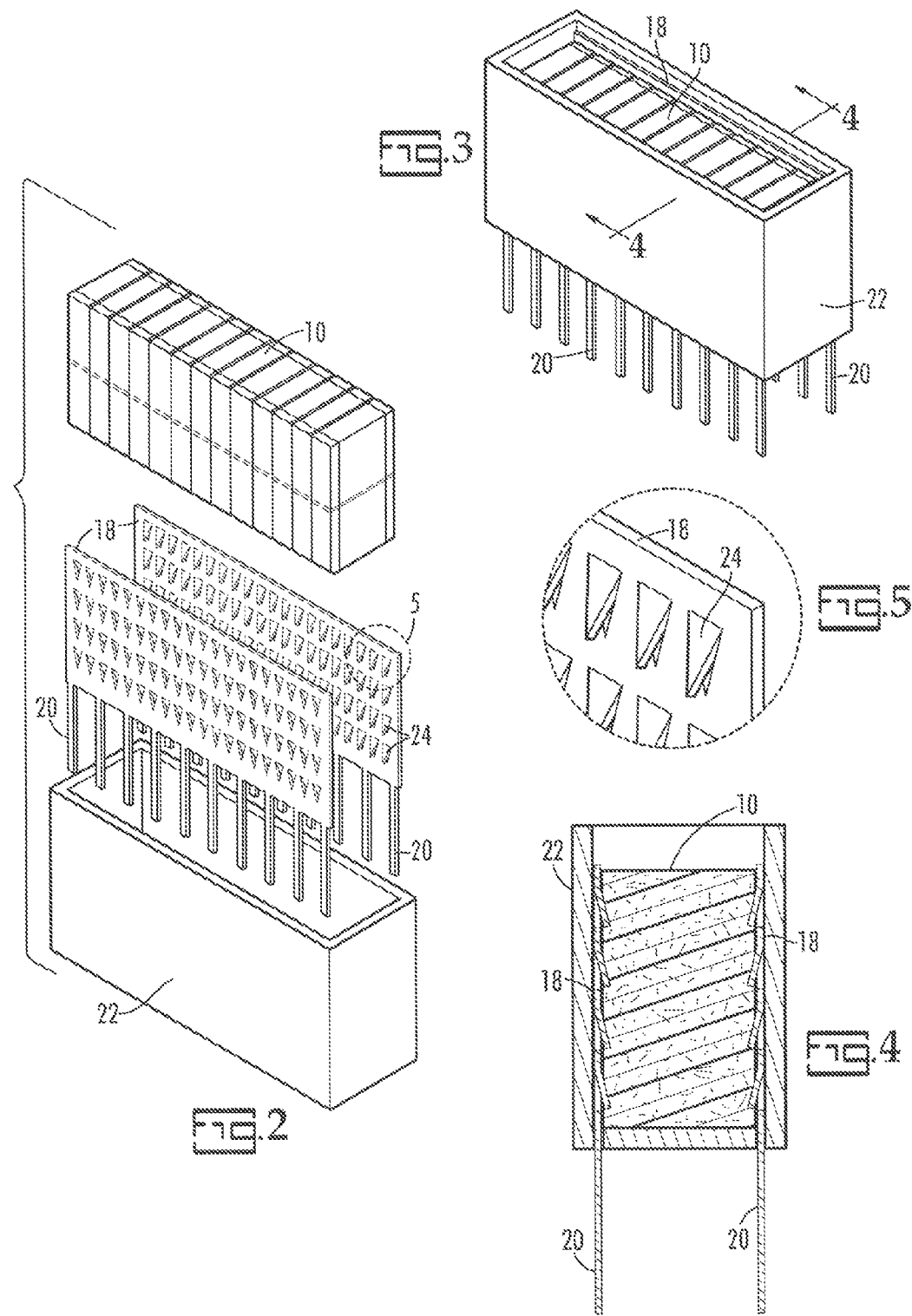

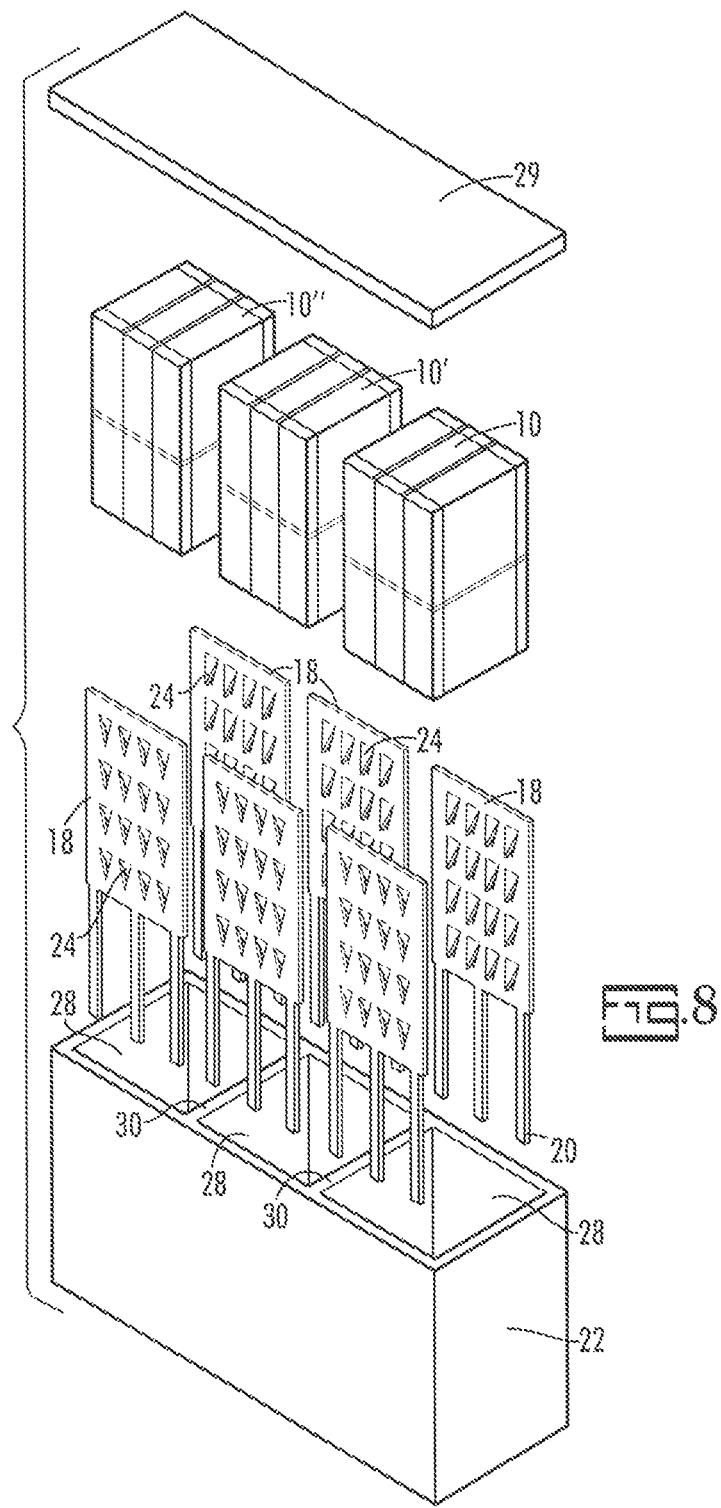

METHOD FOR STACKING ELECTRONIC COMPONENTS

The present application is a divisional application of pending U.S. Pat. No. 13/533,576 filed Jun. 26, 2012.

BACKGROUND

The present invention is related to an improved method for forming stacked electronic components and an improved electronic component formed thereby. More specifically, the present invention is related to a method of forming stacked electronic components wherein the contact between the lead and external termination are less susceptible to thermal fluctuations as realized during assembly and use of the electronic component.

Methods for stacking and attaching lead frames to multilayered ceramic capacitors (MLCC) is well documented in the prior art. Even with the advanced understanding significant challenges remain. Thermal shock resistance and temperature cycling robustness remain a challenge due to coefficient of thermal expansion (CTE) mismatches between the lead frame and the solder materials used to attach the lead frame to the external terminations of the MLCC. This problem is exasperated by temperature requirements which are increasing from the current requirements, of up to 200° C., to future requirement of 250° C. and even up to 350° C. Capacitance-stable high temperature base metal electrode (BME) MLCC's have been developed and proven reliable at 200° C. Studies by Shaddock et. al. in "Reliability Assessment of Passives for 300° C. and 350° C."from IMAPS High Temperature Electronics Network (HiTEN 2011) Jul. 18-20, 2011, Oxford, UK, have shown promising results with a calcium zirconate based dielectric compatible with nickel electrodes at 300° C. and 350° C. The challenge remains to find a lead attachment material that can withstand these extreme temperatures and which allow temperature cycling from −55° C. to high temperatures, exceeding 200° C., without cracking the MLCC at the solder/MLCC end-metallization interface.

Methods for attaching multiple MLCC's in a vertical stack have been documented in the prior art. These methods typically involve using solder attachments or conductive adhesive attachments. Most conductive adhesives degrade above 180° C. and are therefore not suitable for high temperature applications. Welding or wire bonding may also be used to form an electrical connection, but the mechanical strength, especially shear strength, is low. Many of these materials cannot withstand extreme temperature, have undesirable properties at high temperatures or cannot withstand extended cycling to extreme temperatures.

The stacking methods documented in the art typically involve a multitude of tooling configurations in order to accommodate the various numbers of chips in a stack to meet the capacitance need for a specific application. This is an expensive and inflexible process.

There is an ongoing desire to provide a method of forming stacked electronic components, particularly stacked MLCC's which can withstand the temperatures realized during solder reflow.

SUMMARY

It is an object of the invention to provide an improved electronic component, more specifically a capacitor and even more specifically an MLCC, which is less susceptible to thermal cycle failures.

It is another object of the invention to provide an improved electronic component which does not suffer from defects due to coefficient of thermal expansion differences within the connectivity between the electrical component and the lead.

It is a further objective of this invention to provide a high temperature stack that does not require a lead (Pb) based interconnect. These and other advantages, as will be realized, are provided in a method of forming a stacked electronic component comprising:

providing a multiplicity of electronic components wherein each electronic component comprises a first external termination and a second external termination;

providing a first lead frame plate and a second lead frame plate wherein the first lead frame plate and the second lead frame plate comprises barbs and leads;

providing a molded case comprising a cavity and a bottom; and forming a sandwich of electronic components in an array between the first lead frame plate and the second lead frame plate with the barbs protruding towards the electronic components and the leads extending through the bottom.

Yet another embodiment is provided in a method of forming an electronic device comprising:

forming a stacked electronic component by;

providing a multiplicity of electronic components wherein each electronic component comprises a first external termination and a second external termination;

providing a first lead frame plate and a second lead frame plate wherein the first lead frame plate and the second lead frame plate comprises barbs and leads;

providing a molded case comprising a cavity and a bottom; and forming a sandwich of electronic components in an array between the first lead frame plate and the second lead frame plate with the barbs protruding towards the electronic components and the leads extending through the bottom;

placing the stacked electronic component on a circuit board; and passing the circuit board through an IR reflow oven, or IR/convection reflow oven, or a convection oven, or exposed to hot bar reflow or flame reflow heat sufficient to melt the low temperature metal to enhance the electrical connection of the device.

Yet another embodiment is provided in a stacked electronic component. The stacked electronic component has a multiplicity of electronic components wherein each electronic component comprises a first external termination and a second external termination. The electronic components are between a first lead frame plate and a second lead frame plate wherein the first lead frame plate and said second lead frame plate comprises barbs and leads. A molded case comprising a cavity and a bottom houses the electronic components and lead frame plates in a sandwich in an array between the first lead frame plate and the second lead frame plate with the barbs protruding towards the electronic components and the leads extending through the bottom.

BRIEF DESCRIPTION OF FIGURES

FIG. 2 is a schematic exploded view of an embodiment of the invention.

FIG. 3 is a top perspective schematic view of an embodiment of the invention.

FIG. 4 is a side schematic view of an embodiment of the invention.

FIG. 5 is a partial view of an embodiment of the invention.

FIG. 8 is a schematic exploded view of an embodiment of the invention.

DETAILED DESCRIPTION

The present invention is related to an improved method for stacking electronic components, particularly MLCC's, and improved stacked electronic components formed thereby. More specifically, the present invention is related to a stacked electronic component wherein the leads are mechanically engaged with the external terminations of the MLCC instead of chemically engaged such as by soldering and the like. The mechanical engagement allows the contacted parts to contract and expand during temperature fluctuations without detriment.

The invention will be described with reference to the various figures which form an integral, non-limiting, part of the disclosure. Throughout the disclosure similar elements will be numbered accordingly.

Figure 1:
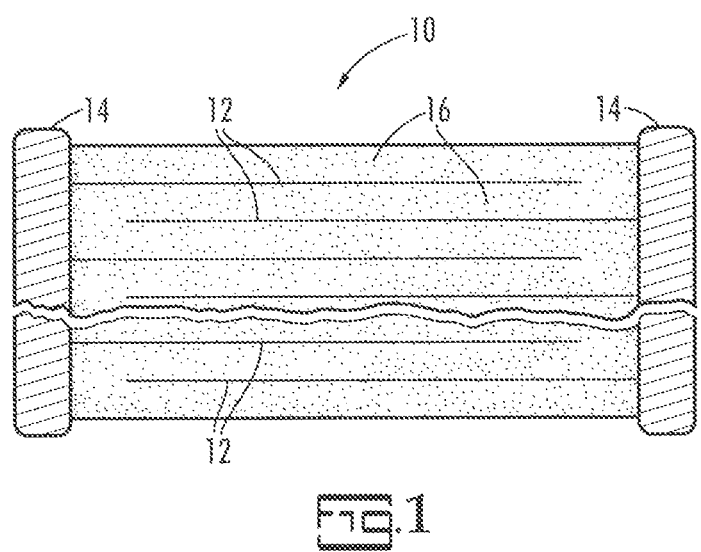
FIG. 1 is a schematic cross-sectional view of an embodiment of the invention.

An MLCC is illustrated in schematic cross-section in FIG. 1. In FIG. 1, the MLCC, generally represented at 10, comprises electrodes, 12, of opposing polarity arranged in a parallel alternating pattern wherein alternate electrodes terminate at external terminations, 14, of opposing polarity. A dielectric, 16, is between the electrodes.

The external terminations of the MLCC suitable for demonstration of the invention are not particularly limited herein. Fired Pd/Ag with an acrylic resin over a fired Cu end metallization is particularly suitable for use as an alternative high-temperature MLCC end metallization. Fired Ag with acrylic resin over fired Cu end metallization is also particularly suitable for use as an alternative high-temperature MLCC end metallization.

The external termination may comprise a fired copper thick film, a nickel plated barrier layer of about 0.5 microns to about 4.0 microns and a plated gold second layer of 0.5-2.0 microns preferably with greater 99% purity gold. Platable silver end metallization may be used and is most preferably used with a 0.5-4.0 micron thick nickel underplate and a 1.0-10.0 micron thick Sn (100% Sn) or Sn/Pb plating layer. The Sn/Pb layer may have 70/30, 90/10 or 60/40 weight percent of tin to lead. The terminations may be thick-film fired silver with silver-palladium such as 2-30% palladium. The terminations may be formed with cured silver-filled conductive adhesive preferably comprising about 65-90% silver. The terminations may have a first fired silver or copper layer with a thickness of about 50-270 micron and a second cured silver-filled conductive polymer adhesive with 65-90% silver.

A multiplicity of MLCC's are taken together to form a stacked capacitor with higher capacitance than readily available from single capacitors. A stacked capacitor of the instant invention is illustrated in exploded schematic view in FIG. 2 and in assembled view in FIG. 3. A cross-sectional schematic view taken along line 4-4 of FIG. 3 is illustrated in FIG. 4.

In FIGS. 2 and 3, a 13×2 array of capacitors is illustrated. The number of capacitors, either rows or columns, is not limited but a 13×2 array, with 26 MLCC's is illustrated for the purposes of discussion without limit thereto. In FIGS. 2 and 3 each MLCC, 10, may be adhered to each adjacent MLCC, such as by an adhesive, to form an array of MLCC's. The array is then inserted between lead frame plates, 18, with leads, 20, extending therefrom. The sandwich of leads and array is then inserted into a molded case, 22, wherein the leads penetrate through the bottom and extend there through. Alternatively, the leads may be inserted into the cavity or the molded case and the MLCC's pressed into the space between the leads until the desired number of MLCC's are between the leads. Barbs, 24, which are illustrated in a cut-away schematic view in FIG. 5, extend inward towards the MLCC's from the plane of the lead frame plates and in the direction of MLCC insertion to impinge upon the external terminations, 14, of the MLCC's thereby forming a secure electrical connection and inhibiting the MLCC's from moving in a direction away from the bottom of the molded case. At least one, but preferably two or more barbs, are in contact with each MLCC. It is preferable that the sandwich of lead frame plates and array is friction fit into the molded case which persuades the protrusions towards the MLCC's thereby securing adequate electrical contact. In a preferred embodiment the barbs converge towards the bottom of the molded case thereby inhibiting the MLCC's from being withdrawn from the case either as an array or individually. After the sandwich is inserted the molded case is preferably sealed. A filler material, such as epoxy resin, may be applied after the components have been inserted into the cavity to provide a further barrier to moisture penetration and further improve mechanical integrity. In this case gasket seals may be applied to the leads prior to insertion. A particular advantage of the invention is that the device does not require solder lead attachment of the lead frame to the external termination. The connection is mechanical between the punched barbs of the lead frame plate and the MLCC termination. Since soldering is not required the CTE mismatch issues are minimized thereby greatly improving thermal cycling robustness.

Figure 6:
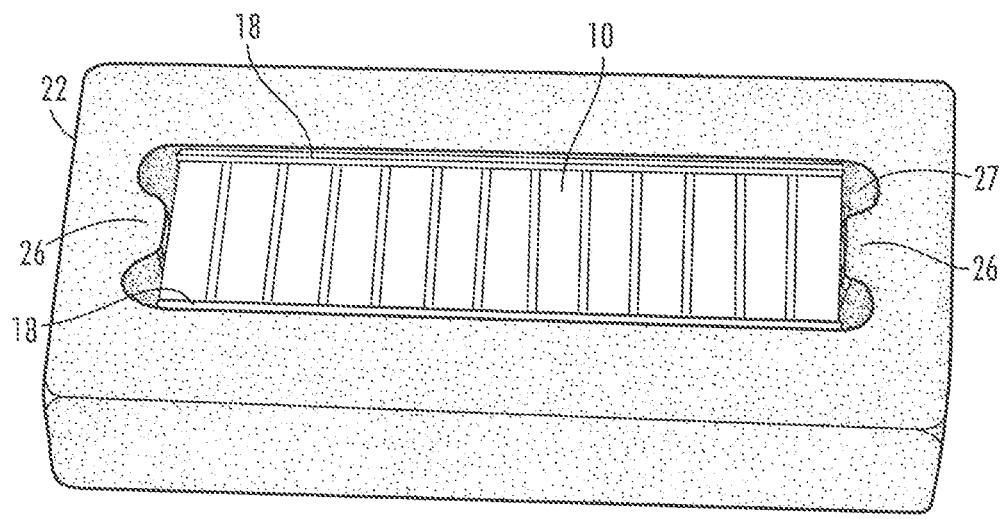
FIG. 6 is a top perspective view of an embodiment of the invention.
Figure 7:
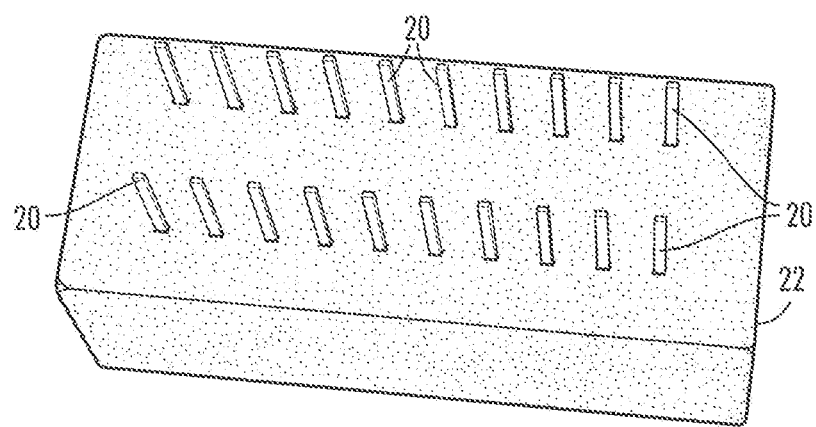
FIG. 7 is a bottom perspective view of an embodiment of the invention.

An assembled capacitor is illustrated schematically in perspective top view in FIG. 6 and in perspective bottom view in FIG. 7. In FIG. 6, the cavity, 27, extends beyond the length of the stack to facilitate insertion of the lead from plate, 18, into the cavity. Ribs, 26, press against the stack to maintain the sandwich in tight friction fit relationship and function as stiffeners.

An embodiment of the invention is illustrated in partial exploded view in FIG. 8. In FIG. 8, the molded case, 22, comprises a multiplicity of cavities, 23, with partitions, 30, between the cavities. The cavities also provide additional strength to the molded case. The example of FIG. 8 provides three discrete capacitor stacks with each having six MLCC's in 3×2 arrays without limit thereto. A molded top cover, 29, is preferred to fully encase the device.

With further reference to FIG. 8, the MLCC may be substituted with other two-terminal electronic components of similar size such as resistors, inductors, thermistors, fuses, diodes, and varistors. Assembly may be used to stack an assortment of two-terminal electronic components of similar size together in the same device in series, such as capacitors and resistors, and may be used for applications such as filtering. In an alternative embodiment electrically isolated sandwiches may have additional functionality. Electronic components 10, 10' and 10" of FIG. 8, for example may represent different combinations wherein any one cavity may have only capacitors, only other two-terminal electronic components or combinations thereof. Not all slots have to be filled. This has benefits for rapid prototyping and modeling in electronic circuits and provides for more flexible assembly.

The leads preferably converge with distance from the plate, optionally to a point, thereby allowing the leads to easily protrude through the bottom of the molded case as the lead frame plate is inserted into the cavity of the molded case.

The leads can be any lead frame material typically used for such applications include Alloy 42, Kovar, Phosphor bronze, Copper, Beryllium Copper, and various alloys thereof. Lead frame material of nickel-iron alloy 42, phosphor bronze alloy 510 or beryllium copper alloy 25 are particularly suitable for demonstration of the invention. The thickness of the lead frame plates is selected to be as thin as possible yet sufficiently thick to allow the leads to penetrate through the bottom of the cavity and the barbs sufficiently strong to maintain non-planarity with the lead frame plate. A thickness of about 0.127 mm to about 0.508 mm is sufficient to demonstrate the invention. The preferred embodiment, is entirely Pb-free.

The barbs are preferably stamped into the lead frame. The barbs preferably protrude about 0.127-0.762 mm at a 5°-30° bend angle sloping in a downward direction towards the lead frame feet. The lead frame plate may have a plating such as a nickel plated barrier layer and a plated gold second layer. The nickel plated barrier layer can be coated at about 1.0 to 4.0 microns and the plated gold second layer can be coated at about 0.5-2.0 microns. The plated gold second layer is preferably >99% purity. Other high temperature plating finishes may be employed such as Ag, AgiPd, Pd and Pt. For lower temperature applications other lead frame plating finishes may be used such as Sn, SniPb, etc.Lead styles N, L, M, J, or K may be employed in the final device.

The lead frames may be plated with a first nickel underplate layer having a thickness of at least 0.5 microns to no more than 4.0 micron and a second plating layer having a thickness at least 1.0 to no more than 10.0 microns and comprising low melting point materials such as 100% Sn, Sn/Bi, or Sn/Pb (70/30, 90/10, 60/40).

The lead frame stand-off can be minimized to have a low profile to save board height. Lead styles of N, L, M, J or K can be used. N style leads are straight with a minimal length of at least 6.35 mm. L and M style leads are formed to extend outward and typically have a length of 1.78 mm±0.25 for L and 1.14 mm±0.25 for M. J and K style leads are formed to extend inward and typically have a length of 1.78 mm±0.25 for J and 1.14 mm±0.25 for K.

The material of construction for the molded case is selected to be a non-conductive material which is suitable for withstanding the conditions of circuit manufacture. While not limited thereto polyimide is a particularly suitable material with polysulfone, high performance fiberglass composite such as FR4, ceramic or glass packages, or molding compounds particularly those with Tg greater than 175° C. for high temperature performance also being suitable for demonstration of the invention. The wall thickness is preferably as thin as possible with the proviso that the physical and mechanical limitations must be suitable for a capacitor. A wall thickness of about 1.0 to about 3.5 mm is suitable for demonstration of the invention when polyimide is used as the material of construction.

The dielectric is not particularly limited herein. The conductive plates are separated by a dielectric as well known in the art and exemplified in U.S. Pat. Nos. 7,211,740; 7,172,935; 7,164,573; 7,054,137; 7,068,450 and 6,906,307 each of which is incorporated herein by reference. Conductive plates separated by dielectric forms a capacitor as known in the art. While not limited thereto, a dielectric layer with a thickness of abort 0.2 µm up to abort 50 µm is suitable for demonstration of the teachings herein. The number of dielectric layers stacked is generally from 2 to about 500 without limit thereto. BME MLCC's using calcium zirconate-based or calcium strontium zirconate titanate-based dielectrics are suitable for demonstration of the invention.

The conductive material which forms the internal electrodes is not critical, although a base metal electrode (BME) is preferably used due to cost considerations, particularly when the dielectric material of the dielectric layers has anti-reducing properties. Typical base metals are nickel, copper, titanium, tungsten, molybdenum, alloys or cermets of base metals or base metal alloys with nickel being preferred. Preferred nickel alloys are alloys of nickel with at least one member selected from Cu, Si, Ba, Ti, Mn, Cr, Co, and Al, with such nickel alloys containing at least 95 wt % of nickel being more preferred. Precious metal electrodes (PME) can be used with the proviso that a sintered silver undercoat is used. Preferred precious metals include silver, palladium, gold, platinum and alloys thereof such as silver-palladium and silver-palladium-platinum. The thickness of the internal electrodes is not particularly limited although about 0.2 µm to about 5 µm is suitable for demonstration of the teachings herein.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic or aqueous vehicle. The raw dielectric material may be a mixture of oxides and composite oxides as previously mentioned. Also useful are various compounds which convert to such oxides and composite oxides upon firing. These include, for example; carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. Raw dielectric material in a powder form having a mean particle size of about 0.1 to about 3 µm is suitable for demonstration of the teachings herein. Dielectrics are well known and not limited herein.

A green chip may be prepared from the dielectric layer-forming paste and the internal electrode layer-forming paste. In the case of deposition by printing methods, a green chip is prepared by alternately printing the pastes onto a substrate of polyethylene terephthalate (PET), for example, in laminar form, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets.

The binder is then removed from the green chip and fired. Binder removal may be carried out under conventional conditions where the internal electrode layers are formed, of a base metal conductor such as nickel and nickel alloys.

The stacked device is placed on a circuit board to form an assembled device and the assembled device is passed through a heating device such as an IR reflow oven, IR/convection reflow oven or a convection oven, or the assembled device is exposed to hot bar reflow or flame reflow heat sufficient to melt the low temperature metal to enhance the electrical connection of the device.

The term "direct" with reference to electrical contact is taken to define an electrical connection between two layers with no layer there between. When two layers of different composition are combined a blended layer wherein one component diffuses into the other thereby forming an intermediate composition is considered a direct electrical connection.

Paste for forming internal electrode layers is obtained by mixing en electro-conductive material with an organic or aqueous vehicle. The conductive material used herein includes conductors such as conductive metals and alloys as mentioned above and various compounds which convert into such conductors upon firing, for example, oxides, organometallic compounds and resinates.

A multitude of stacking configurations can be achieved with this concept with up to 320 electrical components being suitable. Above about 320 components becomes difficult to handle in a manufacturing environment and therefore multiple devices are preferred with 2 to 26 individual MLCC's or other electronic components stacked into one of many possible configurations.

Conductive Adhesive can be added to the assembly around the protruding barbs to enhance electrical conductivity thus lowering ESR. A high temperature, polyimide-based conductive adhesive may be used in high temperature applications. The molded case provides mechanical support and overcomes the low shear strength concerns of the prior art using conductive adhesive.

An embodiment of this invention includes conductive adhesive as a joint. In prior art, conductive adhesive is employed as an attachment, but in practice, the mechanical adhesion is marginal particularly with respect to higher temperature performance. This invention adds mechanical integrity to the device.

EXAMPLE 1

Twenty six identical 2220 size MLCC's each with nominal 0.47 µF capacitance made with calcium zirconate based dielectric compatible with nickel electrodes were stacked vertically into a FR4 base in a 13×2 arrangement. Unplated lead frames were etched from phosphor-bronze alloy 510 ½ hard material. A bending tool with a 20° bend angle was used to create protruding barbs, with a 10-11 mil protrusion from the base lead frame, for electrical and mechanical connection to the MLCC's. The barbs were angled downward so as to secure the MLCC's in place once they are slid into position. The capacitance, dissipation factor and insulation resistance was tested and compared to standard specification limits for a similar stack arrangement with conventionally soldered lead frames. The results are presented in Table 1 wherein the inventive capacitor is indicated to be within standard specification limits. The individual MLCC's were tested for capacitance and dissipation factor (DF) and the results are presented in Table 2. The capacitance and DF of the assembled stack was then measured using the same twenty six MLCC's measured recorded in Table 2 and the results are provided in Table 3. The assembled stack had a capacitance of 1.97 micro-farads compared to 1.97 microfarads for the sum of the capacitances of the 26 individual MLCC's. The DF of the assembled stack was 0.01976% compared to 0.0076% for the average individual MLCC reading. Even though the stack DF (as expected) is higher than the individual MLCC DF, it was well within the specifications.

| Comparison Vs. Specification Limits | | |
| --- | --- | --- |
| Characteristic | Spec Limit | Inventive |
| Capacitance | 12 +/− 10% uF | 11.97 uF |
| Dissipation Factor | <0.10% | 0.02% |
| Insulation Resistance | >83 M-Ohm | 2.0 G-Ohm |

TABLE 2

| Capacitance and DF of individual MLCC inserted into the stack | | |
| --- | --- | --- |
| Sample | Cap (µF) | DF (%) |
| 1 | 0.45450 | 0.006780 |
| 2 | 0.46299 | 0.006700 |
| 3 | 0.45970 | 0.007090 |
| 4 | 0.45588 | 0.007410 |
| 5 | 0.46027 | 0.007480 |
| 6 | 0.46252 | 0.007040 |
| 7 | 0.45691 | 0.007180 |
| 8 | 0.46655 | 0.006980 |
| 9 | 0.46071 | 0.006390 |
| 10 | 0.47733 | 0.006720 |
| 11 | 0.45578 | 0.007330 |
| 12 | 0.45904 | 0.007100 |
| 13 | 0.45768 | 0.006980 |
| 14 | 0.45029 | 0.007210 |
| 15 | 0.46005 | 0.007240 |
| 16 | 0.46062 | 0.007020 |
| 17 | 0.46093 | 0.007400 |
| 18 | 0.46287 | 0.007130 |
| 19 | 0.46052 | 0.006700 |
| 20 | 0.45358 | 0.007260 |
| 21 | 0.45580 | 0.007330 |
| 22 | 0.45954 | 0.006500 |
| 23 | 0.46750 | 0.006940 |
| 24 | 0.46464 | 0.007020 |
| 25 | 0.45790 | 0.007870 |
| 26 | 0.45610 | 0.006890 |
| SUM | 11.9702 | |

TABLE 3

| Cap and DF of assembled capacitor | | |
| --- | --- | --- |
| Sample | Cap (µF) | DF (%) |
| 1 | 11.97070 | 0.012090 |
| 2 | 11.97060 | 0.007720 |
| 3 | 11.97050 | 0.024690 |
| 4 | 11.97050 | 0.034290 |

The invention has been described with reference to the preferred embodiments without limit thereto. One of skill in the art would realize additional embodiments and alterations which are within the scope of the invention as set forth in the claims appended hereto.

The invention claimed is:

1. A method of forming a stacked electronic component comprising:

providing a multiplicity of electronic components wherein each electronic component of said electronic components comprises a first external termination and a second external termination;

providing a first lead frame plate and a second lead frame plate wherein said first lead frame plate and said second lead frame plate comprises barbs and leads;

providing a molded case comprising a cavity and an integral bottom; and forming a sandwich of said electronic components in an array between said first lead frame plate and said second lead frame plate with said barbs protruding towards said electronic components; and inserting said sandwich into said molded case with said leads extending through said integral bottom wherein said leads penetrate said integral bottom of said molded case during said inserting and extend there through.

2. The method of forming a stacked electronic component of claim 1 further comprising:
forming said array of said electronic components prior to said forming of said sandwich.

3. The method of forming a stacked electronic component of claim 1 further comprising:
inserting at least one of said first lead frame plate and said second lead frame plate in said cavity prior to forming said sandwich.

4. The method of forming a stacked electronic component of claim 1 further comprising:
forming said sandwich of said electronic components in said array between said first lead frame plate and said second lead frame plate with said barbs protruding towards said electronic components; and
inserting said sandwich into said cavity wherein said leads extend through said bottom.

5. The method of forming a stacked electronic component of claim 1 wherein at least one said electronic component is a multilayered ceramic capacitor.

6. The method of forming a stacked electronic component of claim 5 wherein said multilayered ceramic capacitor is terminated with at least one material selected from copper film, plated nickel and plated gold.

7. The method of forming a stacked electronic component of claim 5 wherein said multilayered ceramic capacitor comprises a base metal electrode.

8. The method of forming a stacked electronic component of claim 7 wherein said base metal electrode comprises at least one material selected from the group consisting of nickel, copper, titanium, tungsten and molybdenum.

9. The method of forming a stacked electronic component of claim 5 wherein said multilayered ceramic capacitor comprises a precious metal electrode.

10. The method of forming a stacked electronic component of claim 9 wherein said precious metal electrode comprises a material selected from the group consisting of silver, palladium, gold and platinum.

11. The method of forming a stacked electronic component of claim 5 wherein each said electronic component is a multilayered ceramic capacitor.

12. The method of forming a stacked electronic component of claim 5 wherein at least one said electronic component is selected from a group consisting of resistors, thermistors, inductors, fuses, diodes, and varistors.

13. The method of forming a stacked electronic component of claim 5 wherein said multilayered ceramic capacitor comprises a dielectric selected from the group consisting of calcium-zirconate dielectrics or calcium-strontium-zirconate-titanate dielectrics or barium titanate.

14. The method of forming a stacked electronic component of claim 5 wherein said multilayered ceramic capacitor has a length of at least 1 mm to no more than 100 mm.

15. The method of forming a stacked electronic component of claim 14 wherein said multilayered ceramic capacitor has a length of at least 3 to no more than 20 mm.

16. The method of forming a stacked electronic component of claim 1 wherein said sandwich does not comprise an adhesive between said electronic component and said first lead frame plate.

17. The method of forming a stacked electronic component of claim 1 further comprising forming a sintered silver undercoat on said lead frame plate.

18. The method of forming a stacked electronic component of claim 1 wherein said lead frame plates are coated with a nickel barrier layer and a gold, Pd/Ag, Ag plating layer.

19. The method of forming a stacked electronic component of claim 1 wherein said first lead frame plate comprises a material selected from the group consisting of nickel iron alloys, phosphor bronze alloys and beryllium copper alloys.

20. The method of forming a stacked electronic component of claim 1 wherein said first lead frame plate has a thickness of between 0.1 mm-0.6 mm.

21. The method of forming a stacked electronic component of claim 1 wherein said barbs protrude at least 0.1 to no more than 0.8 mm.

22. The method of forming a stacked electronic component of claim 1 wherein said barbs are at an 5°-30° inward bend angle sloping in a downward direction towards said leads.

23. The method of forming a stacked electronic component of claim 1 wherein said molded case comprises a material selected from the group consisting of polyimide, polysulfone, FR4, ceramic or glass.

24. The method of forming a stacked electronic component of claim 1 wherein said molded case comprises a material with a Tg of greater than 175° C.

25. The method of forming a stacked electronic component of claim 1 wherein said molded case has a wall thickness of at least 1.0 mm to no more than 10 mm.

26. The method of forming a stacked electronic component of claim 25 wherein said molded case has a wall thickness of no more than 4.0 mm.

27. The method of forming a stacked electronic component of claim 1 comprising no more than 320 of said electronic components.

28. The method of forming a stacked electronic component of claim 1 wherein said molded case further comprises internal dividers in said cavity.

29. The method of forming a stacked electronic component of claim 1 further comprising adding a cover over said molded case to fully encapsulate said electronic components.

30. A method of forming an electronic device comprising:
forming a stacked electronic component by the method of;
providing a multiplicity of electronic components wherein each electronic component of said electronic components comprises a first external termination and a second external termination;
providing a first lead frame plate and a second lead frame plate wherein said first lead frame plate and said second lead frame plate comprises barbs and leads;
providing a molded case comprising a cavity and an integral bottom; and
forming a sandwich of said electronic components in an array between said first lead frame plate and said second lead frame plate with said barbs protruding towards said electronic components; and
inserting said sandwich into said molded case with said leads extending through said integral bottom wherein said leads penetrate said integral bottom of said molded case during said inserting and extend there through;

placing said stacked electronic component on a circuit board; and passing said circuit board through an IR reflow oven, or IR/convection reflow oven, or a convection oven, or exposed to hot bar reflow or flame reflow heat sufficient to melt the low temperature metal to enhance the electrical connection of the device.

\* \* \* \* \*